(12) United States Patent  
Biagiotti et al.

(10) Patent No.: US 7,645,222 B2  
(45) Date of Patent: Jan. 12, 2010

(54) VARIABLE CROWN ROLLER FOR DEVICES FOR PROCESSING CONTINUOUS WEB MATERIAL AND DEVICE COMPRISING SAID ROLLER

(75) Inventors: Guglielmo Biagiotti, Capannori (IT); Angelo Benvenuti, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 754 days.

(21) Appl. No.: 10/554,925

(22) PCT Filed: May 7, 2004

(86) PCT No.: PCT/IT2004/000252

§ 371 (c)(1),
(2), (4) Date: Oct. 31, 2005

(87) PCT Pub. No.: WO2004/101266

PCT Pub. Date: Nov. 25, 2004

(65) Prior Publication Data

US 2007/0015648 A1    Jan. 18, 2007

(30) Foreign Application Priority Data

May 15, 2003    (IT) ............... FI2003A0134

(51) Int. Cl.
*D21G 1/02* (2006.01)
*B29C 43/46* (2006.01)
*B21D 53/00* (2006.01)

(52) U.S. Cl. .............. 492/5; 492/4; 492/6; 492/10; 492/11

(58) Field of Classification Search .......... 492/1, 492/2, 4, 5, 6, 7, 9, 10, 11, 27
See application file for complete search history.

(56) References Cited

U.S. PATENT DOCUMENTS

| | | | |
|---|---|---|---|
| 3,046,637 A * | 7/1962 | Kusters et al. | 492/5 |
| 3,273,817 A * | 9/1966 | Damiron | 242/571.2 |
| 3,414,210 A * | 12/1968 | Gaudin | 242/571.2 |
| 3,470,948 A * | 10/1969 | Korsch | 165/86 |
| 3,728,767 A * | 4/1973 | Shirai | 26/104 |
| 3,729,788 A * | 5/1973 | Tawa | 26/104 |
| 3,731,357 A * | 5/1973 | Shirai | 26/104 |
| 3,961,119 A | 6/1976 | Thomas | |
| 4,262,400 A * | 4/1981 | Miesch | 492/7 |
| 4,327,467 A | 5/1982 | Quaint | |
| 4,455,727 A * | 6/1984 | Tschirner | 492/4 |
| 4,757,583 A * | 7/1988 | Pav et al. | 492/1 |
| 4,854,520 A * | 8/1989 | Gavin et al. | 242/530.3 |
| 4,856,155 A | 8/1989 | Niskanen et al. | |
| 4,913,051 A * | 4/1990 | Molinatto | 101/376 |
| 5,103,542 A | 4/1992 | Niskanen | |
| 5,290,223 A * | 3/1994 | Lehmann | 492/7 |

(Continued)

FOREIGN PATENT DOCUMENTS

DE    1 151 778    7/1963

(Continued)

*Primary Examiner*—Essama Omgba
(74) *Attorney, Agent, or Firm*—Breiner & Breiner, LLC

(57) ABSTRACT

A pressure roller (3; 7) for devices for processing continuous web materials is described, comprising a lateral surface (3S; 7S), including a regulating system (29, 50) to impose an adjustable crown of the lateral surface (3S; 7S) of the roller deforming said lateral surface.

41 Claims, 5 Drawing Sheets

U.S. PATENT DOCUMENTS

| | | | |
|---|---|---|---|
| 5,338,279 A * | 8/1994 | Schiel | 492/7 |
| 5,507,228 A * | 4/1996 | Schulz | 101/375 |
| 5,599,263 A | 2/1997 | Haiko et al. | |
| 5,871,428 A * | 2/1999 | Renn et al. | 492/7 |
| 5,897,476 A | 4/1999 | Ehrola et al. | |
| 6,261,487 B1 * | 7/2001 | Bongaerts et al. | 264/40.5 |
| 6,524,228 B1 * | 2/2003 | Schrors | 492/7 |
| 7,252,261 B2 * | 8/2007 | Rollins et al. | 242/571.1 |
| 7,455,635 B2 * | 11/2008 | Marti et al. | 492/6 |

FOREIGN PATENT DOCUMENTS

| | | |
|---|---|---|
| DE | 1 940 175 | 2/1971 |
| EP | 0 370 972 A1 | 5/1990 |
| EP | 0 426 548 A1 | 5/1991 |
| IT | 11 92 453 | 4/1988 |
| WO | WO 97/20687 A1 | 6/1997 |

* cited by examiner

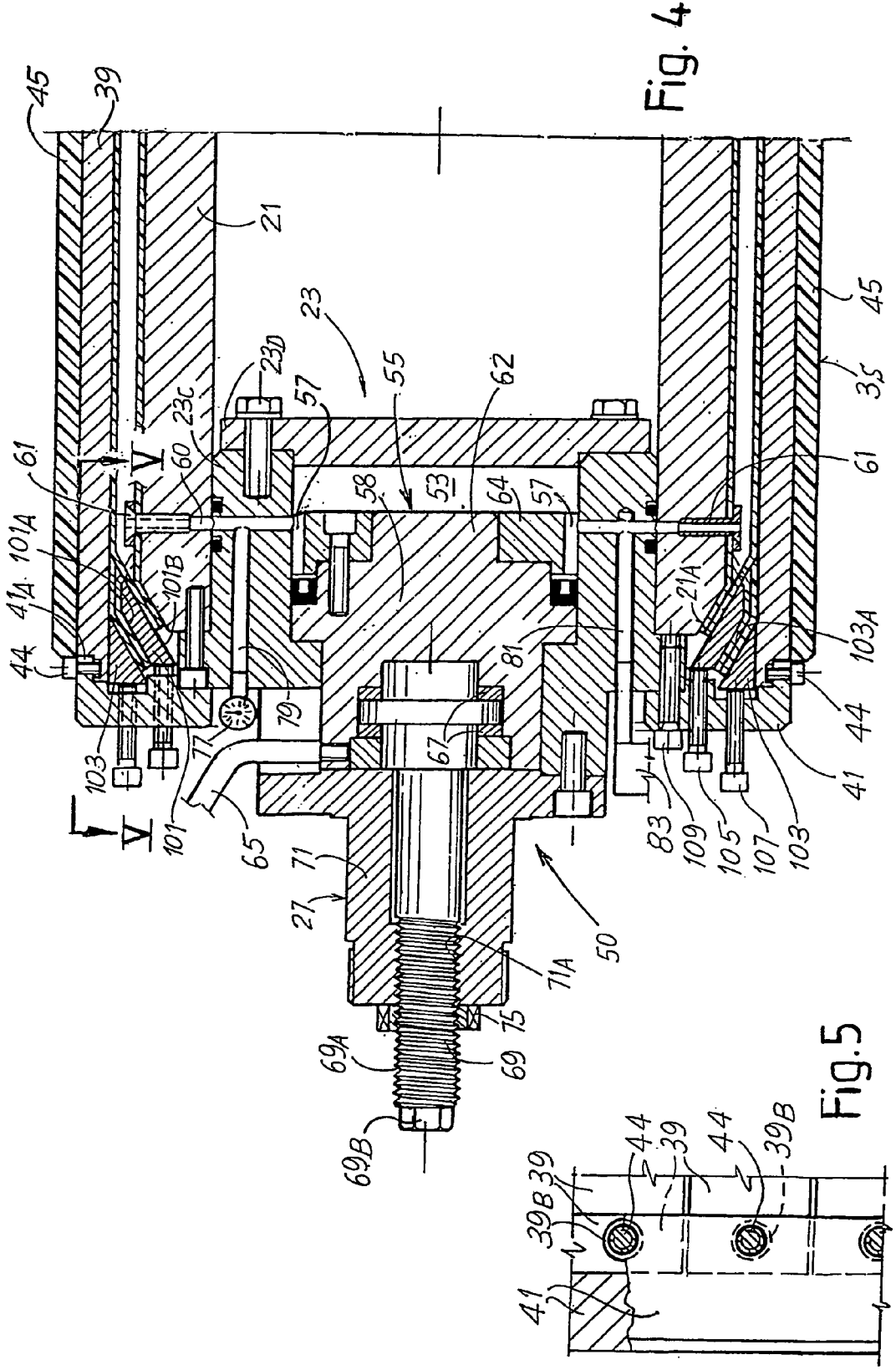

VARIABLE CROWN ROLLER FOR DEVICES FOR PROCESSING CONTINUOUS WEB MATERIAL AND DEVICE COMPRISING SAID ROLLER

TECHNICAL FIELD

The present invention relates to a roller for devices for processing continuous web materials, and more specifically a pressure roller cooperating with a second roller or cylinder, with which it forms a nip through which the web material to be processed is fed, to be subjected to the action of the roller and of the cylinder pressed against each other.

The invention also relates to a device for processing or treating web material comprising a pressure roller and a cylinder or counter-roller cooperating therewith to form a nip through which the web material to be processed is fed.

STATE OF THE ART

In many industrial applications it is necessary to process an essentially continuous web material, such as a plastic film, a paper web material, a non-woven fabric, a metallic sheet, or the like. These web materials are fed through a nip between two rollers or cylinders pressed against each other even at high pressures.

Operations of this type that can be mentioned include calendering operations of both sheets or webs of paper, and of other materials such as metallic or metallized sheets or the like, skins, synthetic leather or other products.

In the specific paper converting field, as well as calenders, embossing or embossing-laminating devices are utilized, wherein a web material constituted by one or more plies is fed between a pressure roller equipped with an elastically yielding surface, and a cylinder, typically made of steel, equipped with protuberances or projections. The yield of the pressure roller and the compression stress exerted between the roller and the cylinder causes embossing of the web material, that is permanent deformation of said material, with partial breakage or deformation of the fibers of which it is composed. The embossing process is utilized both to produce a decoration on the material and to modify the technical characteristics of softness, volume, absorbent capacity and yet others. Purely as an example, embossing machines and devices of this type are described in U.S. Pat. No. 3,961,119; EP-A-370972; EP-A-426548; WO-A-9720687. Embossing devices can be characterized by various layouts of the pressure rollers and of the embossing cylinders and by different methods of laminating separately embossed plies. They may be laminated between the embossing cylinders, or between an embossing cylinder and a laminating roller, or in other ways. Notwithstanding the architecture of the embossing device, drawbacks that will be explained hereunder occur, caused by the bending deformation of the cylinders, induced by the high operating pressures.

The pressure exerted between the pressure roller and the embossing cylinder determines bending deformation of these components. In certain cases bending caused by its own weight may be added to this deformation. This bending deformation, with consequent formation of a camber on the axis both of the pressure roller and of the embossing cylinder, causes a defect in embossing, which is more marked along the edges and less marked in the central area of the web material. The extent of the defect can be considerable depending on the extent of bending deformation of the roller and of the embossing cylinder and on the depth of the embossing design to be obtained on the material.

To avoid this drawback in some cases the pressure roller and the embossing cylinder are mounted with axes slightly skew so as to increase the pressure in the central area of the nip therebetween, to thus compensate bending deformation. However, this solution has the serious drawback of producing transverse forces on the web material and leads to rapid wear of the mechanical parts.

Alternative solutions attempting to obviate this drawback have proved to be somewhat impractical and determine problems of another type. For example, in some cases the pressure roller is subjected to forced bending deformation by applying a bending moment at its ends. This stresses the supports and the necks of the rollers. An example of this type is described in IT-B-1192453.

According to a different approach, a roller is produced comprising a fixed, that is, non-rotating, central axis, about which a cylindrical mantle rotates. Between the fixed axis and the cylindrical mantle actuator members are disposed, typically actuated by a pressurized liquid, which deform the cylindrical mantle. These actuator members are disposed aligned with one another along the axis of the roller and in the plane of the nip between the roller and the counter-roller. Solutions of these types are described and illustrated in the U.S. Pat. Nos. 5,897,476; 5,599,263; 5,103,542; 4,856,155. In practice, when the actuator members are stressed, the roller is deformed, also in this case assuming a curved shape. These systems have considerable drawbacks both due to their complexity and due to the high dynamic stresses to which the members forming the roller, particularly the supporting bearings and the cylindrical mantle, are subjected.

To compensate bending deformation crown rollers are frequently produced; these have a surface that is not perfectly cylindrical, but with a gradual variation in the diameter of the transverse section, with an increased diameter in the central area with respect to the end areas. This solution is considerably limited due to the fact that the crown is fixed and therefore suitable to compensate bending deformation only in one working condition, that is, only with one value of reciprocal stress between the rollers. When the pressure requires to be varied, for example to obtain different effects or processing conditions of the material in the nip between the rollers, the crown imposed on the surface of the pressure roller is either excessive with respect to the bending deformation, causing a defect opposed to that of said deformation, or insufficient and thus unable to compensate bending deformation.

OBJECTS AND SUMMARY OF THE INVENTION

The object of the present invention is to produce a pressure roller, particularly although not exclusively for an embossing unit designed to process a web material in cooperation with an embossing cylinder, which overcomes the drawbacks of traditional rollers and allows optimum working conditions to be obtained, compensating the bending deformations of the pressure roller and of the cylinder cooperating therewith, even when the working conditions vary and the amount of bending of the rollers is thus modified.

The object of the present invention is also to produce a device to process a web material, such as, although not exclusively, an embossing unit that overcomes the drawbacks and limits of traditional devices with regard to compensation of bending deformations of the rollers and cylinders.

Essentially, according to the invention, a pressure roller is provided with a crown, i.e. a gradual variation in the transverse section (with a "barrel-shaped" trend of the outer surface), equipped with a system to vary the crown, that is, a system that allows adjustment, according to needs and working conditions, of the difference in dimensions between the central transverse section—with a larger diameter—and the end transverse sections, with a smaller diameter. Regulation of the crown is obtained by bendingly deforming into a "barrel" shape the lateral surface, that is, the essentially cylindrical surface of the roller, which forms its active surface, cooperating with the corresponding lateral surface of the respective cylinder. Essentially cylindrical is intended in general as an originally cylindrical or more or less cylindrical surface which is deformed to obtain the crown required.

In this way it is possible to deform to a greater or lesser extent, with respect to an ideal cylindrical surface, the lateral surface of the pressure roller to compensate a greater or lesser bending deformation of said pressure roller and of the cylinder cooperating therewith as a function of the pressure exerted by these two components against each other.

When applied to an embosser this allows, for example, an optimal crown to be set as a function of the embossing pressure applied time by time, so as to produce uniform embossing on the entire width of the processed web material.

The roller according to the invention is essentially distinguished from traditional rollers with variable deformation through the effect of a bending load applied at the ends thereof, as these are based on the concept of bendingly deforming the roller or, in any case, the outer surface thereof to make the roller assume a curved configuration, said deformation causing a series of dynamic drawbacks, as highlighted above. Instead, the invention is based on the idea of imposing a variable crown on the roller as a function of processing needs.

According to an advantageous embodiment, the pressure roller has a deformable outer coating, forming an essentially continuous surface, and a central core or nucleus. Disposed between these two components are chambers containing an essentially incompressible fluid. By adjusting the pressure of the fluid in the chambers, more or less marked deformation is imposed on the outer lateral surface of the roller. The chambers extend essentially longitudinally, that is, more or less parallel to the axis of the roller. Moreover, according to a particularly advantageous embodiment of the invention, disposed between the outer coating (which may take the form of a sleeve or an elastically deformable cylindrical liner) and the pressurized fluid chambers are staves, that is, slats produced in a bendingly deformable material, which extend parallel to the axis of the roller, the ends of which are constrained non-rigidly to the essentially rigid central core or nucleus of the roller. The pressurized fluid chambers positioned between the nucleus of the roller and the staves, swell to a greater or lesser extent to impose bending deformation on the staves which is reflected in analogous deformation of the outer coating. The number of staves is sufficiently high, with respect to the degree of deformation and the characteristics of the outer coating of the roller, to guarantee the outer surface of the crown roller, in any case, a shape that can be approximated with sufficient precision to surface of revolution. To obtain deformation of the staves according to a suitable profile, they are constrained at the ends so that they can incline. Therefore, fixed constraint is preferably avoided and a constraint similar to an end support of each stave is preferred. Constraint of the end of the stave allows the end thereof to vary its inclination, so that the entire stave can deform under the thrust of the underlying pressurized fluid chamber, along its entire longitudinal extension, without end areas being forced to remain parallel to the axis of the roller.

Moreover, means will be provided to prevent macroscopic axial or circumferential movements of the staves with respect to the nucleus of the roller, as shall be clarified hereunder with reference to one embodiment.

Further advantageous characteristics and embodiments of the roller according to the invention and of the device comprising said roller are set forth in the appended claims and will be described in greater detail with reference to a non-limiting embodiment of the invention.

BRIEF DESCRIPTION OF THE DRAWINGS

The invention will now be better understood by following the description and accompanying drawing, showing a non-limiting practical example of the invention. In the drawing:

FIG. 4 shows a longitudinal section of one end of a roller according to the invention in a different configuration; and FIG. 5 shows an enlarged detail according to V-V in FIGS. 2A and 4.

DETAILED DESCRIPTION OF THE PREFERRED EMBODIMENT OF THE INVENTION

Figure 1:
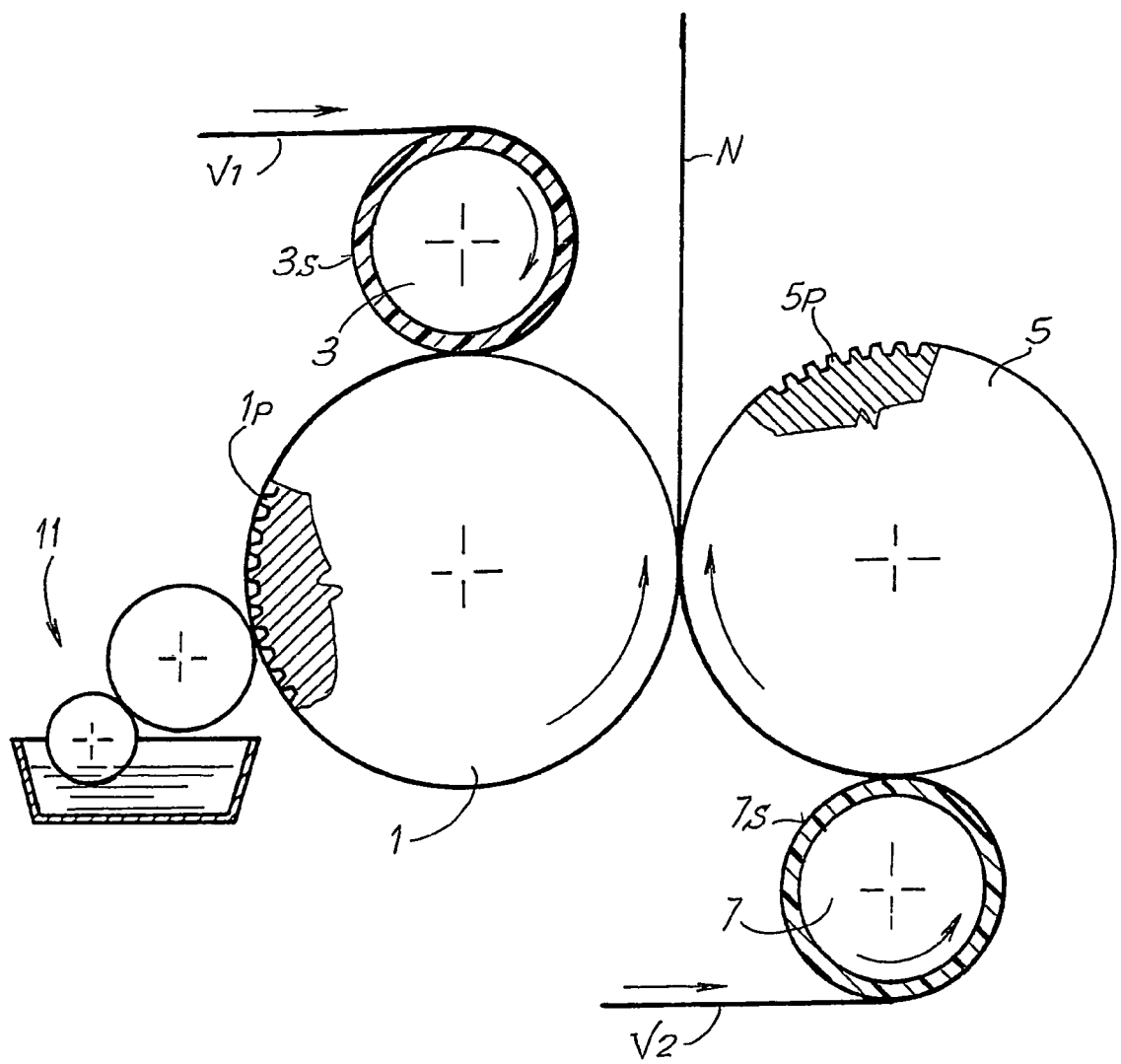
FIG. 1 shows a schematic and extremely simplified diagram of an embosser-laminator of the Up-to-tip type to which the present invention can be applied.
Figure 2A:
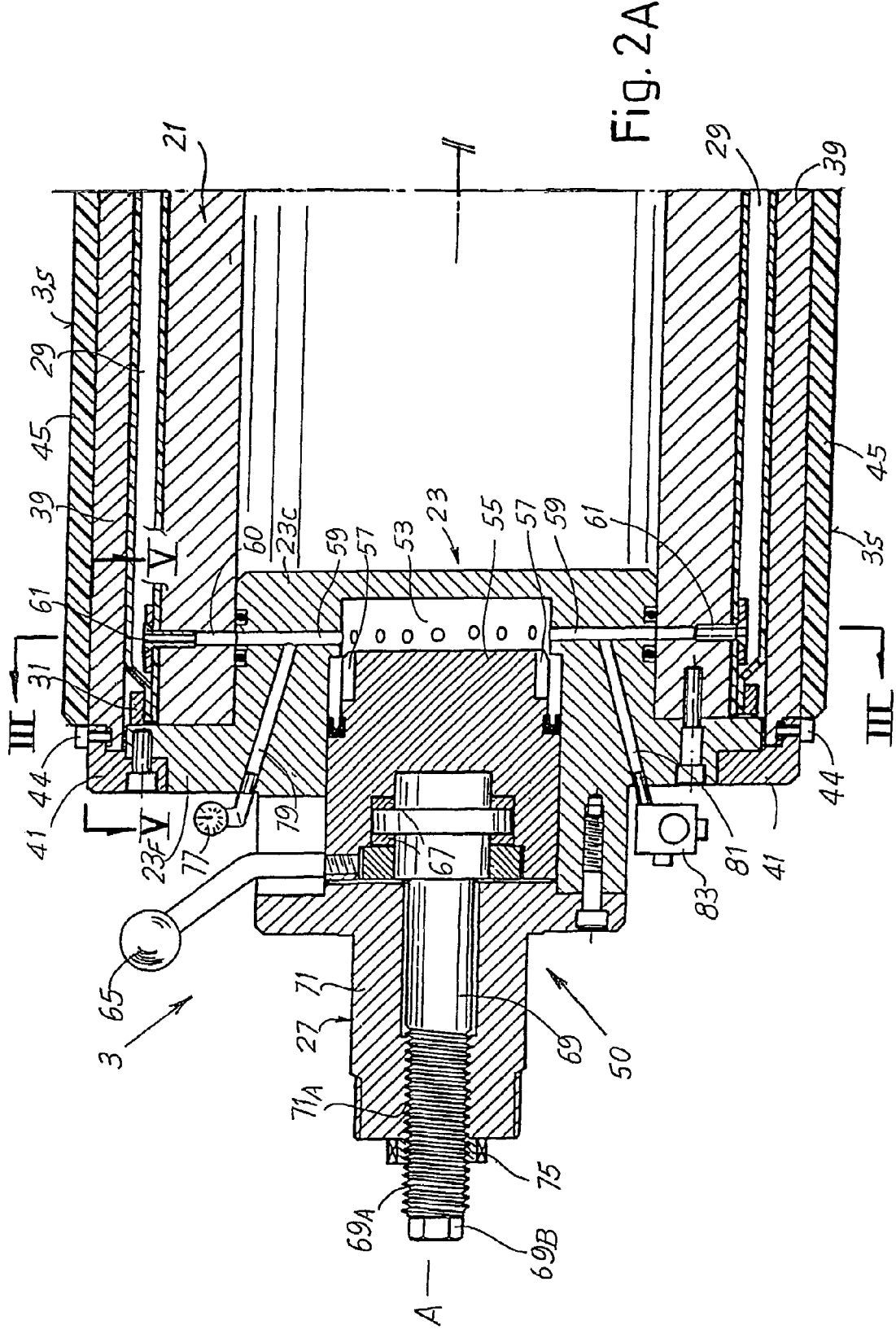
FIGS. 2A and 2B show, in an axial section, the two end portions of a roller according to the invention.
Figure 2B:
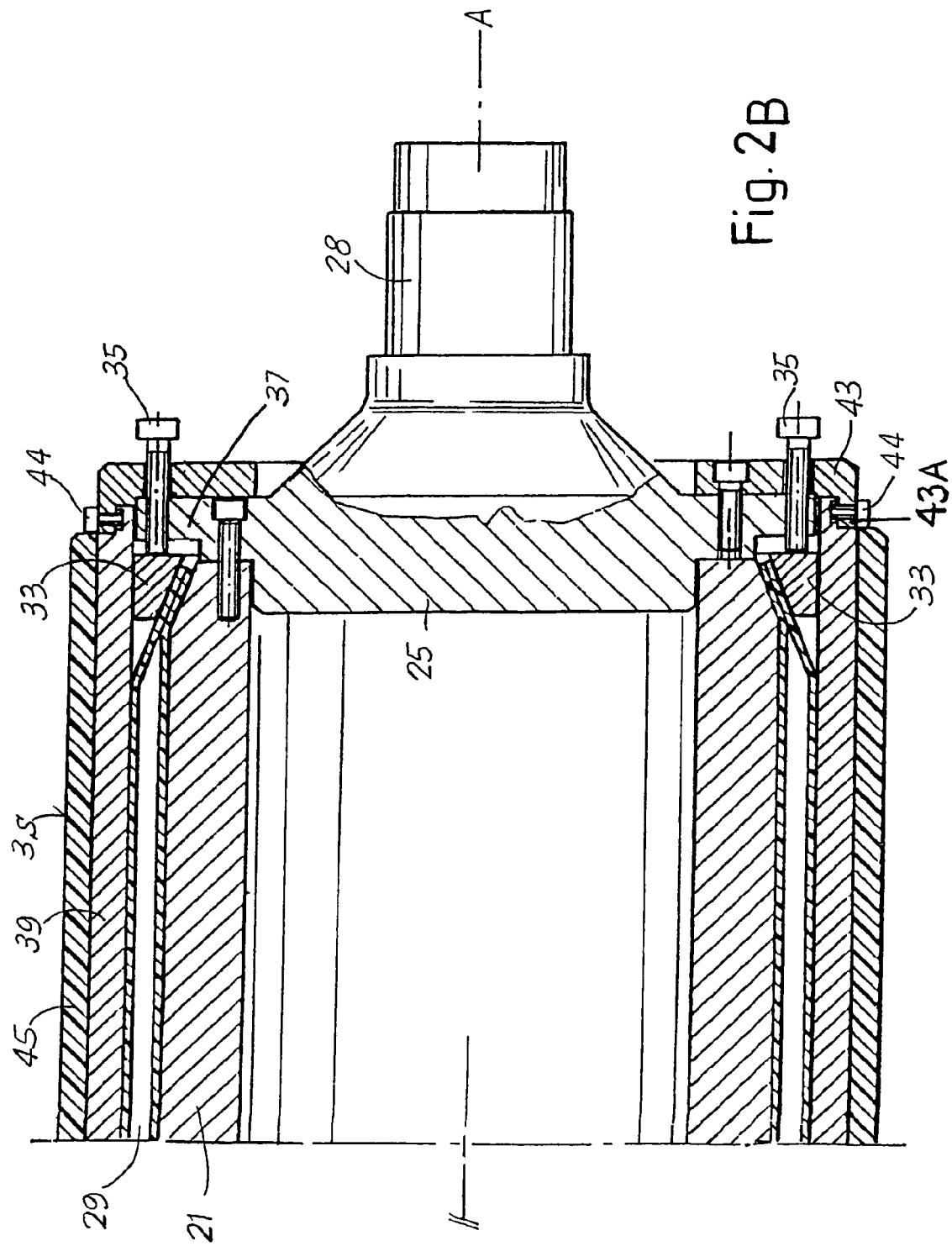
Figure 3:
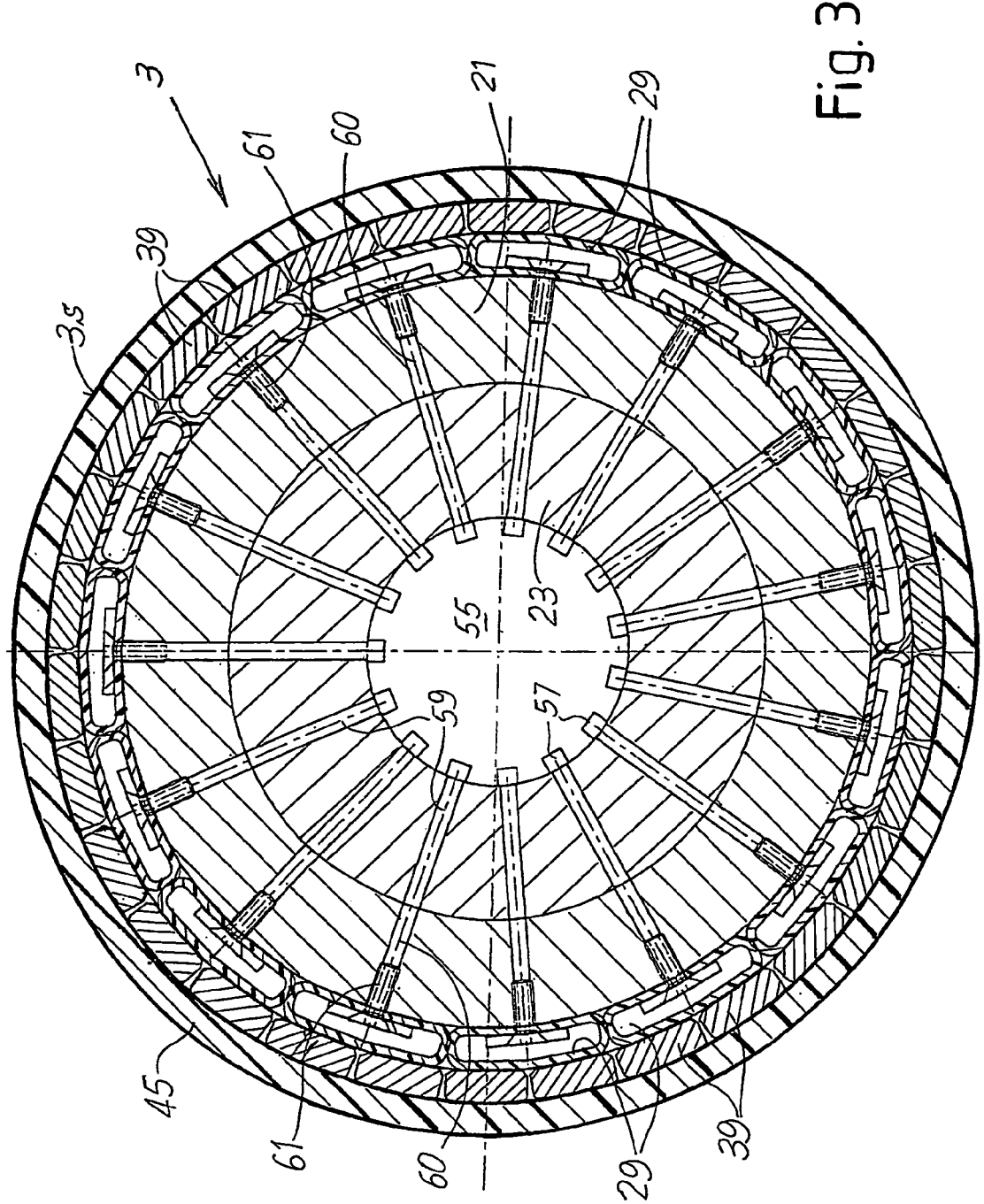
FIG. 3 shows a section according to III-III in FIG. 2A.

FIG. 1 very schematically shows an embossing unit to which the invention may be applied. The unit comprises a first embossing cylinder 1, equipped with protuberances or projections 1P, cooperating with a first pressure roller 3. The pressure roller 3 is provided with a coating in a yielding material, such as rubber, that defines the outer lateral surface 3S. The roller 3 is produced as shown in FIGS. 2A, 2B and 3 and as described hereunder. Disposed parallel to the embossing cylinder 1 is a second embossing cylinder 5, equipped with protuberances 5P and cooperating with a pressure roller 7, also coated in yielding material defining an outer lateral surface 7S, and produced in the manner shown and described hereunder. A glue dispenser 11, which applies glue to the protuberances produced through embossing between the roller 3 and the cylinder 1 on a first ply V1 of paper or another embossable material, cooperates with the embossing cylinder 1. This ply is joined by lamination and gluing to a second ply V2, previously embossed between the pressure roller 7 and the embossing cylinder 5. Lamination is obtained in the nip between the cylinders 1, 5, which are pressed against each other so that at least some protuberances of the first coincide with at least some protuberances of the second.

Embossing devices of this type are per se known and do not require a detailed description in this text. As mentioned, the invention may also be applied to embossing units with a different configuration, for example of the "nested" type, or also to entirely different devices, although with analogous problems relative to bending deformation of the rollers and cylinders under load.

The pressure rollers 3 and 7 are both produced as shown in FIGS. 2A, 2B and 3, wherein the roller 3 is shown as an example.

It comprises a nucleus or core 21 composed of a tubular portion, with which two end elements or heads 23, 25 are associated. The end elements 23, 25 are integral with necks 27, 28 of the roller, by means of which the roller is supported by specific supports disposed on the sides of the machine and not shown. The end element 23 has a central portion or body 23C inserted in the axial cavity of the nucleus 21, and a flange 23F by means of which it is clamped to said nucleus.

Disposed around its nucleus 21 are pressurized fluid chambers, indicated with 29. These chambers are produced in elastomeric material, for example rubber, and have an elongated form, parallel to the axis A-A of the roller. The ends of said chambers are clamped to the end elements 23, 25. In the example shown clamping to the end element 23 is obtained by means of an annular member, that is, a clamping ring 31 which closes the corresponding ends of the chamber 29, while disposed at the opposite end is a clamping ring with a wedge-shaped section 33, constrained by means of push and pull screws—indicated with 35—to a flange 37, which is an integral part of the end element or head 25. The conical surface of the ring 33 cooperates with a corresponding conical surface of the nucleus 21, the ends of the pressurized fluid chambers 29 being clamped between said two conical surfaces.

It must be understood that the two configurations can be interchangeable and that, in particular, a clamping ring with a wedge-shaped section analogous to the ring 33 could also be provided at the end shown in FIG. 2A.

The pressurized liquid chambers 29 are filled with an incompressible fluid, such as oil, to the extent required and in a way described hereunder.

Disposed around the axis A-A of the roller, on the outside of the pressurized fluid chambers 29, are staves 39. The staves 39 are composed of elongated elements parallel to the axis A-A of the roller and with a more or less rectangular transverse section. As can be seen in the transverse section in FIG. 3, in the example shown the number of staves 39 is double with respect to the number of chambers 29. In fact, to obtain a geometrical configuration of the outer surface of the roller that is as close as possible to a surface of revolution with an axis A-A, a high number of staves 39 should be used. On the other hand, the number of chambers 29 may even be relatively limited. The example shown has fifteen chambers 29 and thirty staves, but it must be understood that this arrangement is not binding.

The staves 39 are produced in steel or another material elastically deformable under load. The ends thereof are constrained to the core 21, 23, 25 of the roller 1. Constraint must allow bending deformation of the staves according to a curvature that allows the desired configuration of the outer surface of the roller to be obtained. For this purpose, the ends of the staves must not be fixed but simply be supported at the ends. The supporting constraint is in any case sufficient to prevent significant movements of the staves in an axial or circumferential direction.

In the example shown constraint is obtained in a relatively simple way by means of two annular clamping elements 41, 43 at the two ends of the roller. The annular clamping elements 41, 43 each have an annular projection 41A, 43A cooperating with corresponding end projections 39A of the staves 39. As can be seen in particular in the detail in FIG. 5, a screw 44 is provided for each end of each stave 39, which engages in a threaded hole of the annular projection 41A or 43A of the corresponding clamping element 41 or 43. The end of the screw 44 projects in a blind hole 39B (FIG. 5) produced in the lowered area of the corresponding stave 39, said area forming the end projection 39A of said stave. The diameter of the blind hole 39B is slightly greater than the diameter of the screw, so that there is a certain clearance between these two elements. Consequently, when the stave is deformed through the effect of the load applied by the corresponding chamber 29 acting between it and the nucleus or core 21 of the roller, the stave is deformed as if it were simply supported at the ends thereof (with the exception of the resistance to deformation offered by the outer coating liner 45 which will be mentioned hereunder). Nonetheless, the constraint offered by the two screws 44 on each stave is sufficient to prevent it from being drawn in rotation about the axis of the roller, for example due to friction force. In place of a circular blind hole, a blind hole with an elongated section may be provided, with a transverse dimension equivalent to the diameter of the screw 44 and a longitudinal dimension parallel to the extension of the corresponding stave. A hole of this type prevents movement of the stave along the circular surface of the roller.

Disposed around the assembly of staves 39 is a cylindrical sleeve 45 in elastomeric material, such as rubber, clamped appropriately on the staves 39. The liner 45 forms the yielding outer coating of the pressure roller 3. The cylindrical liner 45 may be clamped on the staves 39 by vulcanization. In this way the staves and the liner form a single element that can be easily fitted and clamped on the roller and subsequently unclamped and removed to be replaced, or rectified. This can be done simply by loosening the screws 44 at both ends of the roller and unscrewing and removing one of the two annular clamping elements 41, 43.

By increasing or reducing the pressure of the incompressible liquid contained in the chambers 29 the bending deformation of the staves 39 is increased or decreased, as is the crown on the outer surface of the sleeve 45. In fact, the greater the pressure of the liquid, the greater the load on the staves 39 and consequently the bending deformation thereof between the two ends constrained to the nucleus 21 and the end elements 23, 25 of the roller.

A regulating device, indicated as a whole with 50, and associated with the end of the roller 3 shown in FIG. 2A, is provided to regulate the pressure of the liquid in the chambers 29. This regulating device comprises a regulation compartment 53 filled with pressurized liquid and produced in the end element or head 23 of the roller. The compartment is closed by a slider 55 that moves in the compartment 53 axially and angularly along and about the axis A-A. This slider has a series of axial grooves 57 in a number equal to the number of the chambers 29 and distributed uniformly around the circular extension of the slider, with a pitch corresponding to the pitch of the ends of radial ducts 59, leading into the compartment 53, produced in the end element 23 and in fluid communication with respective ducts or through apertures 60 produced in the tubular nucleus 21. Each duct 59, 60 places a respective chamber 29 in communication with the regulation compartment 53, through corresponding hollow screws 61 that are screwed into the holes defining the through apertures 60 and clamp the corresponding chamber 29 to the nucleus 21.

Thanks to the angular mobility of the slider 55, the grooves 57 may be taken alternatively to a position coinciding with the ducts 59 or to a position staggered in respect thereof. In the first position the chambers 29 are in fluid communication with the regulation compartment 53 and consequently in fluid communication with one another. In the second position the chambers 29 are isolated with respect to the compartment 53 and also with respect to one another. A lever 65 integral with the slider 55 and which can be locked in two angular end positions allows the angular position of the slider 55 to be adjusted. This arrangement configures a selector to bring the chambers 29 alternately into conditions of fluid communication with the compartment 53 or to isolate them from said compartment and from one another.

The movement to axially adjust the slider 55, which is used to vary the volume of the regulation compartment 53, is obtained as follows. A pin 69, threaded in 69A and with a hexagon end head 69B, is constrained to the slider 55 by means of thrust bearings 67. The thread 69A of the pin 69 engages in a thread 71A of a sleeve 71 rigidly constrained to the end element or head 23 of the roller 3. Rotation of the threaded pin 69 thus causes adjustment of the axial position, along the axis A-A, of the slider 55 and therefore adjustment of the volume of the compartment 53.

In the layout in FIG. 2A the slider 55 is in the position farthest back and therefore the volume of the regulation compartment 53 is maximum. Pressure of the liquid in the chambers 29 is minimum, even equivalent to the ambient pressure. By turning the pin 69 the slider moves to the right (in the figure), thus reducing the volume in the regulation compartment 53. This adjustment takes place with the slider 55 in the angular position so that the grooves 57 are in phase with the ducts 59. Consequently, movement of the slider 55 causes a thrust of liquid from the compartment 53 into the chambers 29, with consequent bending deformation of the outermost wall of the chambers, in contact with the staves 39, and of the staves themselves. This causes an increase in the crown of the outer surface of the roller. The crown is a function of the pressure of the liquid in the chambers 29 and in the volume 53. Upon reaching the desired crown (according to the criteria described hereunder), which may for example conveniently be determined by measuring the pressure, the threaded pin 69 can be clamped by means of a ring nut 75 and the chambers 29 can be isolated from one another by an angular movement of the slider 55, which brings the grooves 57 to staggered positions with respect to the inlets of the ducts 59. The pressure in the compartment 53 and consequently in the chambers 29 can be measured with a gauge 77 connected by means of a duct 79 to said compartment 53.

It is understood that for the purpose of isolating the chambers 29 from one another the slider 55 must be in any case moved to the right (in FIG. 2A) with respect to the position shown herein, until the grooves 57 are brought in front of the inlets of the ducts 59.

The adjustable crown of the pressure roller 3 (and/or of the roller 7) may be set according to choice to compensate the bending deformation of the roller and of the embossing cylinder associated therewith, under the load set for each specific manufacturing process. The function of the regulating device 50 is to set the crown of the pressure roller according to choice (within the limits consented by the dimension of the compartment 53 and by the deformability and strength of the materials). The crown, i.e. the difference between the diameter of the maximum section (in the median plane) and the diameter of the minimum end section (more or less at the level of the areas in which the staves 39 are clamped to the nucleus 21 of the roller) is usually set to double the sum of the cambers of the roller 3 and of the cylinder 1 (or of the roller 7 and of the cylinder 5) for a determined linear working pressure, that is, for a determined force per unit of length of the contact area between these two elements.

In this way the crown compensates the bending deformation and a more or less constant pressure is obtained along the contact line between roller and cylinder. In the central area the lower pressure established due to the bending deformation of the embossing cylinder is compensated by the increased section of the pressure roller. The fact that the chambers 29 are isolated from one another thanks to angular staggering between grooves 57 and ducts 59 means that there is no outflow of pressurized liquid from the chamber 29 subjected to the pressure of the cylinder 1 (or of the cylinder 5) towards the other chambers 29.

Filling of the chambers 29 with pressurized liquid and of the regulation compartment 53 can take place by means of a filling duct 81 and a valve 83. In order to allow air to be vented from the chambers 29 during initial filling, this operation can take place with the roller in a vertical position, with the end in FIG. 2B facing upwards and with the ring 33 with wedge-shaped section loosened. In this way the liquid flows from the bottom towards the top through the duct 81 and gradually fills the chambers 29 until reaching the top end thereof, and air is easily vented from said chambers. After filling, the ring 33 is closed. At this point it is also possible (with the slider 55 in the fully extracted position) to impose a pressure higher than the atmospheric pressure in the compartment 53 and in the chambers 29, so that the roller has a minimum crown at all times, consequently increasing the maximum crown to which it can be set by moving the slider 55;

While a possible method of implementation of the invention has been described in the text above, must be understood that different embodiments may be realized, although based on the idea of producing a roller with variable crown, preferably with a hydraulic system to regulate the pressure of an essentially incompressible fluid inside pressure chambers. In particular, the regulating device could be disposed in a different position and the system of hydraulic ducts that connect the pressure chambers with the variable volume compartment could also differ. Alternatively, although this constitutes a considerable complication, a system could be produced with pressurized liquid chambers all constantly separated from one another, and equipped with corresponding ducts with relative valves, which connect with a filling or discharge device, with a corresponding number of ducts to feed the pressurized liquid. In this case regulation of the camber could take place by connecting each pressurized liquid chamber to a corresponding liquid feed duct, where all the ducts are fed at the same controlled pressure. It would also be possible to use a single duct and to separately and sequentially pressurize all the chambers of the roller to the required pressure, although this would cause difficulties and increase the error in the uniformity of pressure distribution in the various pressurized liquid chambers.

FIG. 4 shows a modified configuration of the end of the pressure roller 3 at the level of which the regulating device 50 is located. Equivalent parts indicate equivalent or corresponding elements to those in the embodiment shown in the previous figures. In the solution in FIG. 4 the slider 55 is composed of a main body 58 with a centering spigot 62 on which a ring 64 is fitted and clamped, with grooves 57 produced thereon. Moreover, the central body 23C of the head 23 is provided with a cap 23D clamped to the body to close the compartment 53 inside which the slider 55 is inserted. In fact, in this case the slider is inserted in the compartment 53 from the opposite side with respect to the neck 27. The configuration allows a compartment 53 with increased volume to be obtained with respect to the volume of the compartment 53 of the embodiment in FIG. 2A, consequently increasing the possibility of adjusting the crown.

The embodiment in FIG. 4 also differs from the previous embodiment for the methods with which the pressurized fluid chambers 29 are clamped. In fact, the chambers 29 may be composed of elements that, in the compressed position, have a rectangular extension, which can be obtained, for example, by cutting a simple tubular pipe. Chambers of this type may be obtained simply from easily produced semi-finished products. Nonetheless, the ends of these are difficult to clamp and close by means of conical clamping surfaces. In fact, the ends of the chambers 29 disposed beside one another on the cylindrical surface of the tubular cylindrical portion of nucleus 21 tend to overlap if clamped against a conical surface.

To avoid this condition of the edges of the chambers 29 overlapping, the clamping system shown in FIG. 4 is provided. In it the nucleus 21 has a conical surface 21A against which the ends of half of the pressurized chambers 29, that is, the ends of every second chamber, are pressed by means of a clamping ring 101. The clamping ring 101 has two conical surfaces 101A and 101B essentially parallel to each other. The conical surface 101A cooperates with the conical surface 21A to clamp the ends of the first group of pressurized chambers 29. The ends of the remaining chambers 29 are clamped between the conical surface 101B of the clamping ring 101 and a conical surface 103A of a second clamping ring 103. In this way the ends of two adjacent chambers 29 are pressed between different pairs of conical surfaces: the surfaces 21A and 101A and the surfaces 101B and 103A, avoiding overlapping of the edges.

The clamping rings 101 and 103 are pressed by means of screws 105, 107 engaged in holes of the annular clamping elements 41, which is in turn engaged by means of screws 109 to the nucleus 21. The same clamping arrangement of the chambers is found at both ends of the roller.

In the embodiment in FIG. 4 the chambers 29 must be of an even number. Therefore, as an example, 32 staves and 16 pressurized fluid chambers may be provided.

It is understood that the drawing merely shows a practical embodiment of the invention, which may vary in forms and layouts without however departing from the scope of the concept on which the invention is based. Any reference numerals in the appended claims are provided purely to facilitate reading in the light of the description hereinbefore and of the accompanying drawings, and do not limit the scope of protection whatsoever.

The invention claimed is:

1. A pressure roller for a device for processing a continuous web material comprising a lateral surface, a regulating system to impose an adjustable crown of the lateral surface to deform said lateral surface, said regulating system including a plurality of pressurized fluid chambers disposed between a nucleus of the roller and an outer coating of the roller, said nucleus and said outer coating rotating integrally about an axis of the roller, wherein a plurality of staves extend approximately parallel to the axis of the roller and are provided between said outer coating and said pressurized fluid chambers.

2. The pressure roller as claimed in claim 1, wherein said pressurized fluid chambers extend longitudinally along said roller essentially parallel to the axis of the roller and are disposed approximately uniformly around the axis of the roller.

3. The pressure roller as claimed in claimed 2, wherein ends of said pressurized fluid chambers are clamped at each end of the roller by a first clamping ring and a second clamping ring, the first clamping ring cooperates through a first conical surface thereof with a conical surface of the nucleus of the roller, and the second clamping ring cooperates through a conical surface thereof, with a second conical surface of the first clamping ring, the ends of said chambers being clamped alternatively between said first clamping ring and said nucleus and between said first clamping ring and said second clamping ring respectively.

4. The pressure roller as claimed in claim 1, wherein ends of said staves are constrained to the nucleus of the roller and bend between ends thereof under thrust of the pressurized fluid chambers.

5. The pressure roller as claimed in claim 4, wherein the ends of said staves are constrained by constraints that allow said ends of said staves to assume a variable inclination as a function of said thrust.

6. The pressure roller as claimed in claim 5, wherein said constraints limit axial and tangential movements of the staves with respect to the nucleus of the roller.

7. The pressure roller as claimed in claim 1, wherein said outer coating and said staves are joined together to form an assembly that can be mounted and removed with respect to the nucleus of the roller.

8. The pressure roller as claimed in claim 1, wherein said staves are greater in number with respect to said pressurized fluid chambers.

9. The pressure roller as claimed in claim 8, wherein said staves are double in number with respect to said pressurized fluid chambers.

10. The pressure roller as claimed in claim 1, wherein said staves are made of metal and said outer coating comprises a liner of elastomeric material.

11. The pressure roller as claimed in claim 1, wherein said regulating system further includes a regulating device associated with said pressurized fluid chambers to regulate pressure in said chambers.

12. The pressure roller as claimed in claim 11, wherein said pressurized fluid chambers are communicating with a variable volume regulation compartment adjustable by said regulating device.

13. The pressure roller as claimed in claim 12, wherein a selector brings said pressurized fluid chambers alternatively into a condition of communication with said compartment or into a condition of isolation from said compartment.

14. The pressure roller as claimed in claim 13, wherein said selector comprises a body angularly movable about an axis thereof and equipped with a plurality of grooves parallel to said axis which through an angular movement of said body can alternatively assume a position angularly aligned or staggered with respect to corresponding ducts in communication with said pressurized fluid chambers, said ducts communicating through said grooves with said regulation compartment.

15. The pressure roller as claimed in claim 14, wherein said regulation compartment is delimited by a movable slider, a position of said slider being adjustable to regulate volume of said compartment and thereby pressure of fluid in said pressurized fluid chambers.

16. The pressure roller as claimed in claim 15, wherein said body and said slider are composed of a single member provided with a translatory movement along said axis of the body and with an angular movement about said axis.

17. The pressure roller as claimed in claim 15, wherein said regulation compartment is in an end element of said roller.

18. The pressure roller as claimed in claim 17, wherein said end element has a central portion wherein said regulation compartment is present and surrounded by a flange.

19. The pressure roller as claimed in claim 18, wherein constraints of a first end of each of said staves are associated with said flange.

20. The pressure roller as claimed in claim 19, wherein said constraints comprise an annular clamping element fixed to said flange and with an annular projection cooperating with corresponding end projections of said staves.

21. The pressure roller as claimed in claim 18 or 19, wherein said central portion has a plurality of radial ducts communicating with said compartment and leading into said end element on a surface thereof, which are in fluid communication with corresponding through-apertures through the nucleus of the roller, said pressurized fluid chambers being fixed on said nucleus, in communication with said compartment through said apertures and said radial ducts.

22. The pressure roller as claimed in claim 14 or 16, wherein said axis of the body coincides with the axis of the roller and wherein said ducts have an essentially radial extension.

23. The pressure roller as claimed in claim 15, wherein said movable slider is associated with a screw regulating member to regulate the position of the slider in said regulation compartment.

24. The pressure roller as claimed in claim 15, wherein said movable slider is constrained to an angular control member to set an angular position of the slider.

25. The pressure roller as claimed in claim 12, wherein said regulation compartment is in fluid communication with a filling duct.

26. The pressure roller as claimed in claim 12, wherein said regulation compartment is in connection with a gauge.

27. The pressure roller as claimed in claim 11, wherein said pressurized fluid chambers are equipped with a venting system to vent air, to allow the chambers to be filled completely with a liquid.

28. The pressure roller as claimed in claim 27, wherein said venting system is disposed at a first end of the roller and said regulating device is disposed at a second end of said roller.

29. The pressure roller as claimed in claim 27, wherein said venting system comprises at least one sealed clamping ring of the pressurized fluid chambers which can be loosened to allow air to be vented from said chambers during filling with said liquid.

30. The pressure roller as claimed in claim 29, wherein said at least one sealed clamping ring has a first conical surface cooperating with a corresponding second conical surface of the nucleus of the roller, ends of said pressurized fluid chambers being clamped between said first conical surface and said second conical surface.

31. The pressure roller as claimed in claim 29, wherein at said first end of the roller is a head or end element constrained to the nucleus of the roller and with which said at least one sealed clamping ring is engaged.

32. The pressure roller as claimed in claim 31, wherein at least one further clamping ring is associated with said second end of the roller to clamp said pressurized fluid chambers.

33. The pressure roller as claimed in claim 32, wherein said at least one further clamping ring comprises a conical surface cooperating with a conical surface of the nucleus of the roller.

34. The pressure roller as claimed in claim 33, wherein said at least one further clamping ring is constrained to a flange of a corresponding end element.

35. A device for processing a continuous web material comprising at least one cylinder cooperating with a pressure roller pressed against each other, wherein said pressure roller is according to claim 1, 2, 4, 11, 12, 13, 14, 15, 27, or 3.

36. The device as claimed in claim 35, wherein said at least one cylinder is an embossing cylinder.

37. The device as claimed in claim 35, wherein pressure between said pressure roller and said cylinder is adjustable, the pressure roller having a crown which is adjustable as a function of said pressure.

38. A pressure roller for a device for processing a continuous web material comprising an active lateral surface, a plurality of pressurized fluid chambers disposed between a nucleus of the pressure roller and an outer coating of the pressure roller and, between said outer coating and said pressurized fluid chambers, a plurality of staves extending substantially parallel to an axis of the pressure roller and ends of the pressure roller are constrained to the nucleus of the pressure roller.

39. A pressure roller for a device for processing a continuous web material comprising an active lateral surface; a plurality of pressurized fluid chambers disposed between a nucleus of the pressure roller and an outer coating of the pressure roller, and extending longitudinally along said pressure roller; and a plurality of staves extending substantially parallel to an axis of the pressure roller and being disposed between said outer coating and said pressurized fluid chambers, ends of the pressure roller being constrained to the nucleus of the pressure roller.

40. A pressure roller for a device for processing a continuous web material comprising an active lateral surface; a plurality of pressurized fluid chambers disposed between a nucleus of the pressure roller and an outer coating of the pressure roller and extending longitudinally along said pressure roller; and a plurality of staves extending substantially parallel to an axis of the pressure roller and being disposed between said outer coating and said pressurized fluid chambers, ends of the staves being constrained to the nucleus of the pressure roller; wherein said pressurized fluid chambers are in fluid communication with a compartment with a variable volume, said compartment and said pressurized fluid chambers being filled with an essentially incompressible fluid, a selector being provided to selectively bring said pressurized fluid chambers into communication with said volume or to isolate the pressurized fluid chambers from said volume.

41. A pressure roller for a device for processing a continuous web material comprising an active lateral surface, a nucleus, a plurality of pressurized fluid chambers disposed between said nucleus of the pressure roller and an outer coating of the pressure roller and, between said outer coating and said pressurized fluid chambers, a plurality of staves extending substantially parallel to an axis of the pressure roller, wherein ends of the pressure roller are constrained to the nucleus of the pressure roller, and the nucleus and the outer coating forming the active lateral surface of the pressure roller rotate integrally about the axis of the pressure roller.

\* \* \* \* \*